US008213901B2

(12) United States Patent
Hartikainen et al.

(10) Patent No.: US 8,213,901 B2
(45) Date of Patent: Jul. 3, 2012

(54) SUBSCRIBER IDENTITIES (75) Inventors: Auvo Hartikainen, Tampere (FI); Kalle Tammi, Nokia (FI); Toni Miettinen, Oulu (FI); Lauri Laitinen, Espoo (FI); Philip Ginzboorg, Espoo (FI); Pekka Laitinen, Helsinki (FI)

(73) Assignee: Nokia Corporation, Espoo (FI)

( * ) Notice: Subject to any disclaimer, the term of this patent is extended or adjusted under 35 U.S.C. 154(b) by 912 days.

(21) Appl. No.: 11/114,216

(22) Filed: Apr. 26, 2005

(65) Prior Publication Data
US 2005/0278420 A1    Dec. 15, 2005

(30) Foreign Application Priority Data
Apr. 28, 2004  (GB) .................. 0409496.7

(51) Int. Cl.
*H04M 1/66*  (2006.01)
*H04L 29/06*  (2006.01)
*H04L 9/08*  (2006.01)
*G06F 21/00*  (2006.01)
*H04K 1/00*  (2006.01)

(52) U.S. Cl. ........ 455/411; 713/156; 713/172; 380/247; 380/279

(58) Field of Classification Search .............. 455/406, 455/411; 713/156, 169, 172, 182; 380/247, 380/270, 279, 286
See application file for complete search history.

(56) References Cited

U.S. PATENT DOCUMENTS

| 5,765,105 | A | * | 6/1998 | Kuriki | 455/410 |
|---|---|---|---|---|---|
| 5,943,620 | A | * | 8/1999 | Boltz et al. | 455/445 |
| 6,253,327 | B1 | * | 6/2001 | Zhang et al. | 726/14 |
| 7,296,290 | B2 | * | 11/2007 | Barriga et al. | 726/8 |
| 2005/0009520 | A1 | * | 1/2005 | Herrero et al. | 455/435.1 |
| 2006/0195565 | A1 | * | 8/2006 | De-Poorter | 709/224 |
| 2006/0195893 | A1 | * | 8/2006 | Caceres et al. | 726/8 |
| 2007/0184819 | A1 | * | 8/2007 | Barriga-Caceres et al. | 455/411 |

FOREIGN PATENT DOCUMENTS

| EP | 1365620 | 11/2003 |
| WO | WO 03/005669 A1 | 1/2003 |
| WO | WO 03/081431 A1 | 10/2003 |

OTHER PUBLICATIONS

3GPP TS 33.220,V6.0 (Mar. 2004).*
Bernhard Petri,"Early introduction of IP-based Mutlimedia Services in Mobile Networks", Siemens, AG 2003.*
Bernhard Petri,"Early introduction of IP-based Multimedia Services in Mobile network", Euresom Summit 2003, Oct. 1, 2003.*
Garcia, M. et al., "*3GPP Requirements on SIP*", IEFT Standard-Working-Draft, Internet Engineering Task Force, No. 1, XP 015013488, Nov. 2001, pp. 1-33.

(Continued)

*Primary Examiner* — George Eng
*Assistant Examiner* — Muthuswamy Manoharan
(74) *Attorney, Agent, or Firm* — Mintz, Levin, Cohn, Ferris, Glovsky & Popeo, P.C.

(57) ABSTRACT

There is disclosed a method for verifying a first identity and a second identity of an entity, said method comprising: receiving a first and second identity of said entity at a checking entity; sending information relating to at least one of the first and second identities to a home subscriber entity; and verifying that said first and second identities both belong to the entity from which said first and second identities have been received.

12 Claims, 9 Drawing Sheets

OTHER PUBLICATIONS

3GPP TS 33.220, v6.0.0, "*3rd Generation Partnership; Technical Specification Group Services Aspects; Generic Authentication Architecture (GAA); Generic Bootstrapping Architecture (Release)*", XP-002334596, Mar. 2004, pp. 1-18.

3GPP TS 29.109 v7.1.0; 3rd Generation Partnership Project; Technical Specification Group Core Network and Terminals; Generic Authentication Architecture (GAA); Zh and Zn Interfaces based on the Diameter protocol; Stage 3 (Release 7); Dec. 2005, pp. 1-27.

3GPP TS 29.229 v5.12.0; 3rd Generation Partnership Project; Technical Specification Group Core Network; CX and DX interfaces based on the Diameter protocol; Protocol details (Release 5); Jun. 2006, pp. 1-23.

3GPP TS 29.328 v7.3.0; 3rd Generation Partnership Project; Technical Specification Group Core Network and Terminals; IP Multimedia (IM) Subsystem Sh interface; Signaling flows and message contents (Release 7); Sep. 2006, pp. 1-41.

3GPP TS 29.329 v7.4.0; 3rd Generation Partnership Project; Technical Specification Group Core Network and Terminals; Sh Interface based on the Diameter protocol; Protocol details (Release 7); Sep. 2007, pp. 1-18.

Calhoun et al., "RFC 3588, Diameter Base Protocol", Sep. 2003, downloaded from the Internet < http://www.rfc-editor.org/rfc/rfc3588.txt> on Aug. 24, 2009.

Aboba et al., "RFC 2486, The Network Access Identifier", Dec. 2005, downloaded from the Internet < http://www.rfc-editor.org/rfc/rfc4282.txt> on Aug. 24, 2009.

3GPP TS 29.228 V6.2.0, 3rd Generation Partnership Project; Technical Specification Group Core Network; IP Multimedia (IM) Subsystem CX and DX interfaces; Signalling flows and message contents (Release 6), Mar. 2004.

EPO Communication pursuant to Article 94(3) dated Nov. 11, 2009, issued in connection with counterpart European Application No. 05742449.1-2413.

ETSI TS 129 228, v5.7.0, "Digital cellular telecommunications system (Phase 2+); Universal Mobile Telecommunications System (UMTS); IP Multimedia (IM) Subsystem Cx and Dx Interfaces; Signalling flows and message contents", 3GPP TS 29.228 versions 5.7.0 Release 5, Mar. 2003.

SA3 3GPP Draft; S3-030469: "Stage 3 level specification directions for support for subscriber certificate work item", Jul. 25, 2003.

* cited by examiner

SUBSCRIBER IDENTITIES

FIELD OF THE INVENTION

The present invention relates to the identities of a communication terminal, especially in a mobile terminal and in particular, but not exclusively, the invention relates to a mechanism for verification between a public identity and a private identity of a terminal.

BACKGROUND OF THE INVENTION

The current development towards truly mobile computing and networking has brought on the evolution of various access technologies, which also provide the users with access to the Internet when they are outside their own home network. The first public communication network that provides a truly ubiquitous World Wide Web (WWW) access is the GSM-based mobile telephone network.

So far, the use of the Internet has been dominated by person-to-machine communications, i.e. information services. The evolution towards the so-called third generation (3G) wireless networks brings along mobile multimedia communications, which will also change the way IP-based services are utilized in public mobile networks. The IP Multimedia Subsystem (IMS), as specified by the 3rd Generation Partnership Project (3GPP), integrates mobile voice communications with Internet technologies, allowing IP-based multimedia services to be utilized in mobile networks.

The inventors have identified an important problem with mobile multimedia communications in third generation wireless networks, namely that of identity coherence checking. This problem permeates both the field of application authentication and Generic Authentication Architecture.

The new multimedia capable mobile terminals (multimedia phones) provide an open development platform for application developers, allowing independent application developers to design new services and applications for the multimedia environment. The users may, in turn, download the new applications/services to their mobile terminals and use them therein.

In addition to application authentication, a network operator needs to be able to monitor whether an application is being used by a bone fide subscriber. A bone fide subscriber is a subscriber who has loaded the application legally, and paid any fees required by the application owner. Network operators typically apply security measures in terminals or delivery systems in order to ensure only bone fide subscribers have access to the application. Monitoring information can be used to detect possible cracking of security measures applied to terminal or delivery systems, where this cracking relates to application authentication. Once detected, an unauthorized user of an application can be prevented from using the application on the network.

Figure 1:
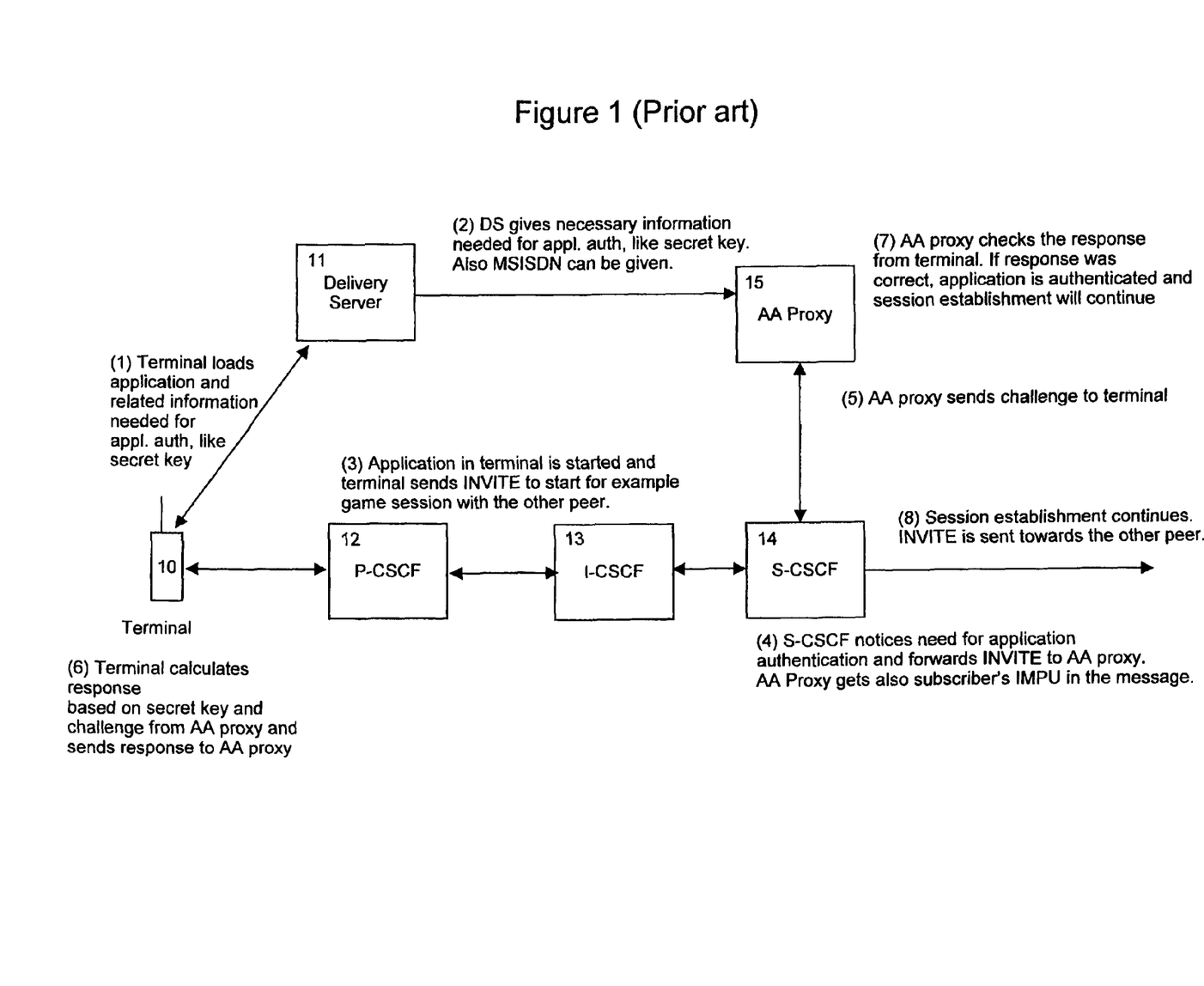
FIG. 1 shows an overview of application authentication.

The basic principle of application authentication and a plurality of related network elements, comprising a part of a network are presented in FIG. 1. A first terminal 10 loads (1) application and related information needed for application authentication, a secret key for example, from a Delivery Server (DS) 11. DS 11 provides (2) necessary information needed for application authentication, a secret key and possibly a Mobile Station ISDN Number (MSISDN) for example, to an Application Authentication (AA) Proxy 15. An application in the first terminal 10 is started, and the first terminal 10 sends (3) a Session Initiation Protocol (SIP) message such as INVITE to a Proxy Call State Control Function (P-CSCF) 12 in order to start for example a game session with a second terminal. After the SIP message is sent to the P-CSCF 12, it is passed from the P-CSCF 12 to an Interrogating Call State Control Function (I-CSCF) 13. The I-CSCF 13 receives the SIP message from P-CSCF 12 and sends it to a Serving Call State Control Function (S-CSCF) 14.

The S-CSCF 14 receives the SIP message and identifies a need for application authentication (4), the S-CSCF 14 forwards the SIP message to AA proxy 15. The S-CSCF 14 also sends the terminal subscriber's IMPU (IMS Public Identity) to the AA proxy 15. The AA proxy 15 receives the SIP message and the IMPU from S-CSCF 14 and sends a challenge towards the first terminal 10. The AA proxy 15 sends the challenge to S-CSCF 14. S-CSCF 14 passes the challenge to I-CSCF 13. I-CSCF 13 passes the challenge to P-CSCF 12. P-CSCF 12 delivers the challenge to the first terminal 10.

The first terminal 10 receives the challenge and calculates a challenge response (6) based on a secret key for example. The first terminal 10 then sends the challenge response to the AA proxy 15. The AA proxy 15 receives (7) the challenge response from the first terminal 10. Only if the challenge response from the first terminal 10 is correct does the application receive authentication and session establishment continues. Upon receiving authentication from the AA proxy 15, the S-CSCF 14 allows session establishment to continue (8) by forwarding the SIP message towards the second terminal.

Application authentication can be used on an IP (Internet Protocol) based IMS (IP Multimedia Subsystems) network to ensure that peer-to-peer applications operating on the network use identifiers assigned to them. Applications and related rights may be loaded from a Delivery Server (DS) 11 to a terminal. Other information can be loaded, for example a secret key that may also be needed for application authentication. Once an application is started in a first terminal an INVITE is sent towards another party, which may comprise a second terminal. The network is then able to authenticate the application. With reliable application authentication it is possible to use, for example, advanced charging models. Authentication at network side is done by the Application Authentication Proxy (AA Proxy) 15.

The application authentication may be performed by exploiting interfaces defined in Generic Authentication Architecture GAA. GAA which will be described later.

The Delivery Server (DS) receives a subscriber's MSISDN during the loading of an application. The MSISDN may be sent to the AA Proxy with the other information needed for application authentication.

However, this mechanism has a problem. Peer-to-peer application usage may be started as described above by sending a SIP message through the IMS network from a first peer to a second peer. The message is authenticated by the AA Proxy. In the SIP message, the subscriber identity used is an IMS Public Identity (IMPU). In order for the AA Proxy to check that the IMPU sent belongs to the first peer, and that the first peer has loaded the used application legally (i.e. that the first peer is a bone fide subscriber), it is necessary to be able to verify between the IMPU and MSISDN, but no mechanism for this has been suggested or disclosed.

An IP Multimedia Subsystem (IMS) uses two identities, an IMPU and an IMPI (IMS Private Identity). The IMPI may be derived from the International Mobile Subscriber Identity (IMSI). This method is mandatory in the 3GPP standards, where an IMPI is to be formed in the case of Universal Subscriber Identity Module (USIM) being used in a terminal. A subscriber has an IMPI, but may have a plurality of IMPUs. These IMPUs may be said to be correlated to the IMPI. A Home Subscriber Server stores a list of IMPUs for each IMPI.

The problem of identity binding checking will now be described with reference to Generic Authentication Architecture (GAA). GAA is to be used as a security procedure for a plurality of future applications and services. However, the inventors have identified a flaw in GAA where it is used as a security system for applications that use a terminal's Public Identity as a user identity.

GAA uses IMPI (IMS Private Identity) as a user's identity in security specific signalling. Some applications that use GAA use only IMPU as a user identity, not IMPI. These GAA applications may use the IMPU as obtained from the User Equipment (UE) as a key in security procedure. In this situation, the opportunity is available for the UE to perform bootstrapping operations with its IMPI in order to receive services based on security certificates etc. with an IMPU corresponding to another IMPI. In other words, a problem with the GAA is that a first terminal having a private identity may use the public identity of a second terminal, so that the first terminal is allowed to obtain services that it is not entitled to.

Figure 2:
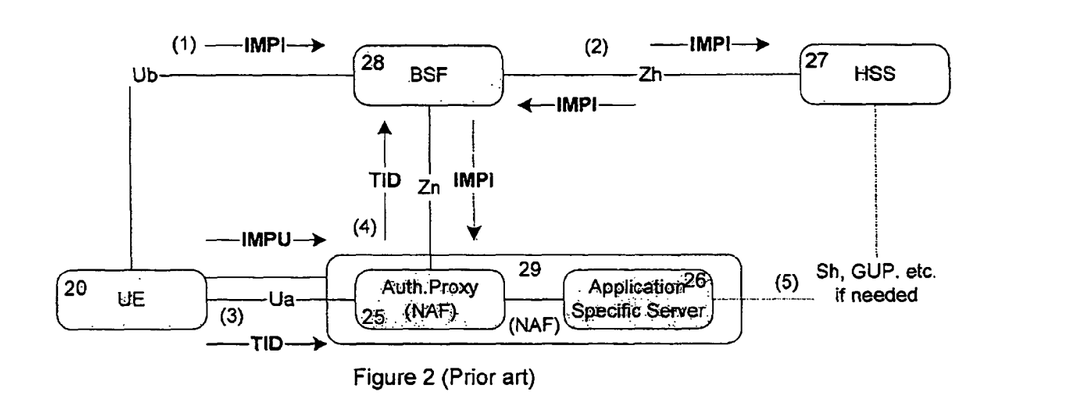
FIG. 2 shows known GAA identifier flows for GAA applications.

The inventors have identified a problem with the currently defined mechanism in GAA, in that it is not possible to deliver independently the bootstrapped IMPI and the IMPU, used in GAA services, to the Network Application Function (NAF), so that the NAF can perform coherence checking. FIG. 2 illustrates some elements of a network in order to show prior art GAA identifier flows for GAA applications.

A comparison between the two prior art systems of FIGS. 1 and 2 will now be made. The delivery server 11 of FIG. 1 loosely corresponds to the Bootstrapping Server Function BSF 28 of FIG. 2. Similarly loosely, the AA proxy 15 and S-CSCF 14 of FIG. 1 correspond to the NAF 29. These items loosely correspond in that they perform similar roles in the authentication process, however it should be borne in mind that FIGS. 1 and 2 relate to different embodiments of a wireless communication network. For example, a difference is that the UE 20 of FIG. 2 does not download an application from BSF 28, UE 20 simply establishes a security association by running a bootstrapping procedure with BSF (as defined in 3GPP TS 33.220). Also, BSF 28 of FIG. 2 does not send information about the security association to the NAF 29, the NAF 29 must request the security association from BSF 28 using a TID as the key. Further, part of the functionality of the AA proxy 15 of FIG. 1 would be performed by the BSF 28 of FIG. 2, i.e., an authentication process related to an Authentication and Key Agreement (AKA) procedure. The AKA procedure will be described in more detail below.

Upon session initialisation, a User Entity (UE) 20, which may be a mobile terminal, sends its IMPI to a Bootstrapping Server Function (BSF) 28 via a Ub interface. This step may also be described as the UE 20 performing bootstrapping with its IMPI, wherein this bootstrapping session is uniquely identified by a TID. BSF 28 communicates with a Home Subscriber Server (HSS) 27 via a Zh interface using the received IMPI. The NAF 29 receives the TID and the IMPU from UE 20 via the Ua interface after the bootstrapping has been carried out. The NAF 29 then communicates with the BSF 28 using the Zn interface. The NAF 29 optionally comprises an Authorisation Proxy (AP) 25 and an Application Specific Server (AS) 26. Optionally, the NAF 29 may communicate with the HSS 27 via an Sh interface The Sh interface is used to get IMPU specific profile information from the HSS 27. The IMPU specific profile information may be related to a service that the NAF 29 is implementing. It should be noted that either an Sh interface or a Generic User Profile (GUP) may be used to do this.

The transfer of an IMPI from BSF 28 to NAF 29 is optional. Such a transfer is only performed with NAFs that are trusted to receive the IMPI. Typically, only a verification that the IMPU belongs to a subscriber is sufficient, this may be ascertained by verifying TID-to-IMPU mapping, where TID is a Transaction Identifier. TID-to-IMPU mapping requires identification of a bootstrapping session in BSF 28. Only the BSF 28 and the UE 20 are capable of verifying TID-to-IMPI mapping.

The apparatus shown in FIG. 2 disadvantageously does not comprise a mechanism to verify coherence between the IMPI and the IMPU used by GAA services.

Embodiments of the present invention seek to address the above-described problems.

SUMMARY OF THE INVENTION

Embodiments of the present invention provide means to verify coherence of a subscriber's identities; both in the field of application authentication and Generic Authentication Architecture.

Embodiments of the present invention may verify a subscriber's MSISDN/IMPU relation or an IMPI/IMPU relation using MAP (Mobile Application Part) and diameter interfaces defined by 3GPP.

Embodiments of the present invention may also provide improvement to a DIAMETER interface, so as to allow generic retrieval of a subscriber's IMS identities (IMPI and IMPU). The verification of binding between a subscriber's MSISDN and IMS identities is envisaged to be useful in a wide variety of problems.

[Summary to be completed once claims are finalised]

BRIEF DESCRIPTION OF THE DRAWINGS

For a better understanding of the present invention and as to how the same may be carried into effect, reference will now be made by way of example to the accompanying drawings in which.

DETAILED DESCRIPTION OF THE INVENTION

The MAP (Mobile Application Part) interface in a Home Subscriber Server (HSS) 17 has an operation called Send_IMSI, which can be used to fetch a subscriber's IMSI based on a given MSISDN. 3GPP has defined Cx interface (DIAM- ETER protocol is used), which is used between the HSS 17 and the I-CSCF 13 and also between the HSS 17 and the S-CSCF 14 in an IMS network. The IMPI is derived from the IMSI and utilizing information available in AA Proxy (MSISDN and IMPU), the AA Proxy can verify IMPU/MSISDN relation by using interfaces towards HSS.

The embodiments described in relation to FIG. 3 to 6 are in the context of an IMS system having an architecture similar to that of FIG. 1 and accordingly the architecture will not be described in detail again.

Figure 3:
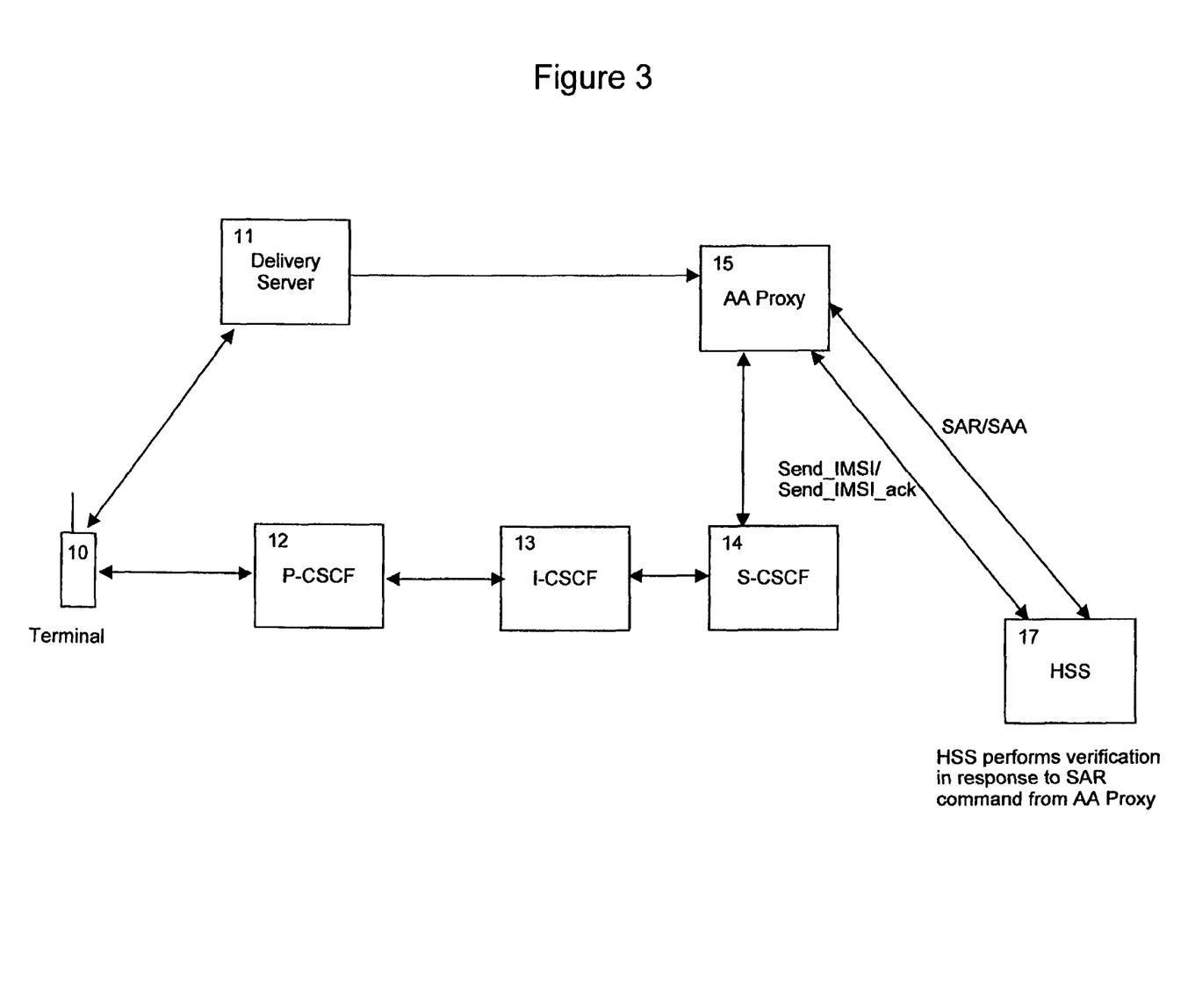
FIG. 3 shows an identity binding verification method using SAR/SAA.

FIG. 3 presents a first phase of one embodiment in which MSISDN/IMPU binding is checked. Checking can be done in real time every time an application authentication is performed, alternatively the AA Proxy 15 can perform a check just once for a pre defined time period and then store the MSISDN/IMPU binding for later use. The AA proxy 15 sends a Send_IMSI instruction with MSISDN set as a parameter in the instruction to the HSS 17. The HSS 17 replies to AA proxy 15 with a Send_IMSI_ack command, which comprises the subscriber's IMSI.

Four alternative embodiments for the implementation of embodiments of the invention will now be described. Common to these embodiments, is a first phase, in which the AA proxy 15 receives both the public and private identity of a first terminal or user. The AA proxy 15 receives the MSISDN of the first terminal 10 from the delivery server (DS) 11. The IMPI of the first terminal 10 may be derived from its IMSI, which is obtained by using the Send_IMSI command as described above. The IMPU of the first terminal 10 is received by AA proxy 15 when the SIP message is forwarded from S-CSCF 14. Thus, the AA proxy 15 has received the IMPU from the first terminal 10, and derived the first terminal's IMPI from the IMSI, the IMSI being fetched from HSS using the MSISDN received from the first terminal 10.

In the first phase, a Send_IMSI command is used by the AA proxy 15 to obtain a subscriber's IMSI from HSS 17, this IMSI is based on the MSISDN received from the first terminal. The IMPI is then derived from the IMSI, such that the AA proxy 15 has the IMPI and IMPU as transmitted by the first terminal. In a second phase, the AA proxy can verify that the two identities received from the first terminal belong to the same subscriber. This is achieved by means of one of four methods which will be described below with reference to respective first to fourth embodiments.

FIG. 3 shows a first embodiment of the present invention, wherein the second phase comprises using a Server-Assignment-Request (SAR) command sent from the AA proxy 15 to the HSS 17. A SAR command is normally used by the Serving Call State Control Function (S-CSCF) 14 to update a subscriber's registration status in the Home Subscriber Server (HSS) 17. The SAR command contains both the IMPI and the IMPU derived from the first terminal 10. Normally, in reply to a SAR command, the HSS 17 sends a Server-Assignment-Acknowledge command to the S-CSCF 14. According to an embodiment of the present invention, a SAR command is sent from the AA proxy 15 to the HSS 17, as shown in FIG. 3. This SAR command contains both the IMPI and the IMPU used by the first terminal 10. The HSS 17 returns the subscriber's data to the AA proxy 15 in a Service-Assignment-Answer (SAA) acknowledge command. The HSS 17 verifies consistency of the IMPI and the IMPU of the first terminal 10. Implicitly, the HSS verification ascertains whether the IMPU and the MSISDN used by the first terminal 10 belong to same subscriber. This is because the IMPI is derived from IMSI, which is fetched by using MSISDN.

According to one embodiment of the present invention, the AA proxy sends a SAR command to the HSS 17 to verify that MSISDN and IMPU belong to the same user and thus verify that the user with the received IMPU has loaded the application legally. The HSS 17 receives the SAR command containing IMPU and IMPI from the AA proxy 15. The HSS 17 only replies by sending an SAA command to the AA proxy 15 if the IMPI and the IMPU sent in the SAR command correlate with each other, in other words the HSS 17 will check that the IMPI and the IMPU relate to the same entity.

By default, the HSS 17 checks that the SAR command comes from the subscriber's current S-CSCF address. This step may be unnecessary in the present embodiment and so the HSS 17 is preferably modified to skip the address checking step.

Figure 4:
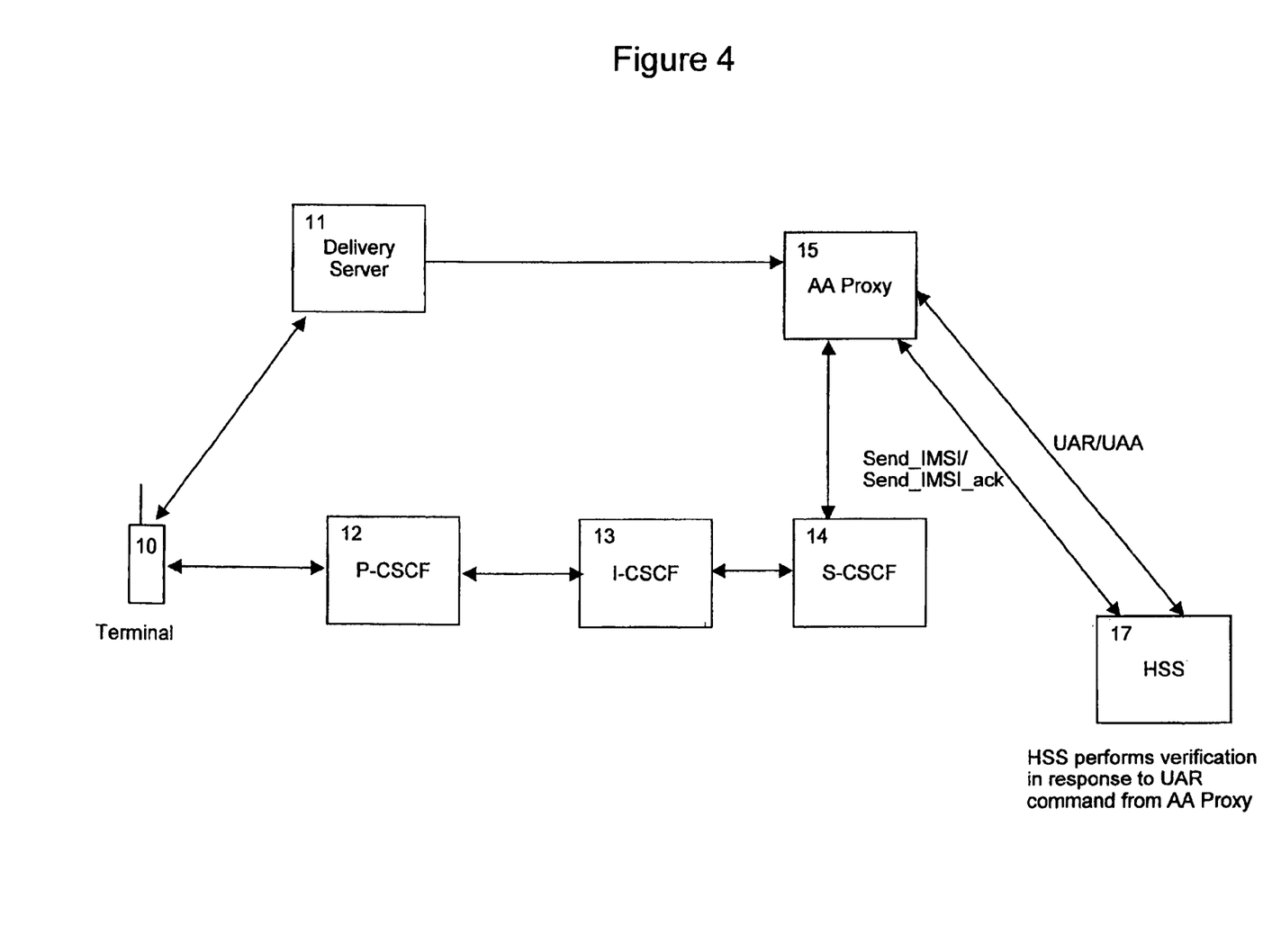
FIG. 4 shows an identity binding verification method using UAR/UAA.

FIG. 4 shows a second embodiment of the present invention, wherein the second phase comprises using a User-Authorization-Request (UAR) command. Normally, the UAR command is used by the Interrogating Call State Control Function (I-CSCF) 13 to fetch a subscriber's current S-CSCF address from the Home Subscriber Server (HSS) 17. The UAR command contains IMPI and IMPU. Normally, the HSS 17 replies to the I-CSCF 13 with a User-Authorization-Answer (UAA), which includes a current S-CSCF address.

According to the second embodiment of the present invention, the AA proxy 15 sends a UAR command to the HSS 17. The UAR command contain the IMPI and IMPU of the first terminal. The HSS 17 performs verification between the IMPI and the IMPU used in the UAR command. Thus, the HSS 17 verifies that a particular IMPI (which is derived from the MSISDN, as described above) and a particular IMPU belong to the same user and so verify that the subscriber with the particular IMPU has legally loaded the application in use. The HSS 17 only replies by sending a UAA command to the AA proxy 15 if the IMPI and the IMPU sent in the UAR command correlate with each other.

The second embodiment can be implemented into existing communication networks without the need for modification to the system. Further, this embodiment provides a solution where a subscriber's public and private identity relation can be verified by using existing MAP and DIAMETER interfaces defined by 3GPP.

Figure 5:
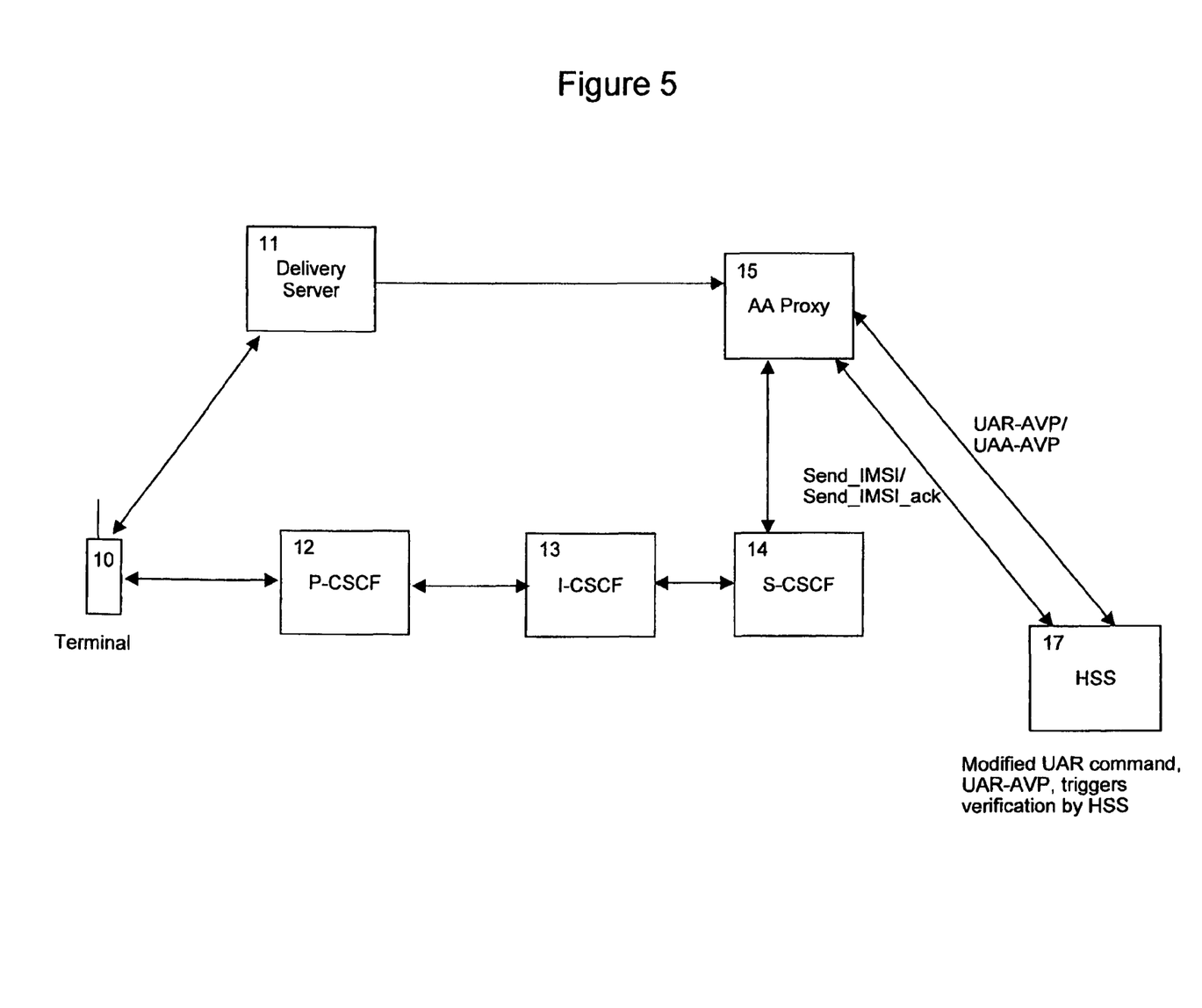
FIG. 5 shows an identity binding verification method using modified UAR/UAA.

FIG. 5 shows a third embodiment of the present invention, wherein the second phase comprises the use of an extended User-Authorization-Request (UAR) command sent from the AA proxy 15 to the HSS 17. The messaging will now be described. The extended UAR command is sent from the AA Proxy 15 to the HSS 17. The UAR command contains both IMPI and IMPU and is extended to carry a new value in an existing User-Authorization-Type Attribute value pair (AVP). This new value could be for example APPLICATION_AUTHENTICATION. The extended UAR command is indicated as UAR-AVP in FIG. 5. Where the check yields an affirmative result, the HSS 17 will return to the AA Proxy 15 an extended UAA (User-Authorization-Answer) command comprising a new optional grouped AVP (e.g. Public-Identity-List AVP) to carry all of a plurality of the user's IMPUs, each of which is related to the IMPI. The extended UAA command is identified as UAA-AVP in FIG. 5. Upon receipt of the plurality of the user's IMPUs, the AA Proxy 15 may verify that the list of IMPUs comprises the IMPU received from the first terminal 10, and thus verify coherence between the IMPI and IMPU used by the first terminal.

The above embodiment of the present invention allows wider use UAR/UAA commands for checking identity coherence. In alternative embodiments, the use of extended UAR/UAA commands is not limited to AA proxy. For example, in some embodiments it may be advantageous for the I-CSCF 13 to use the extended UAR/UAA commands.

Figure 6:
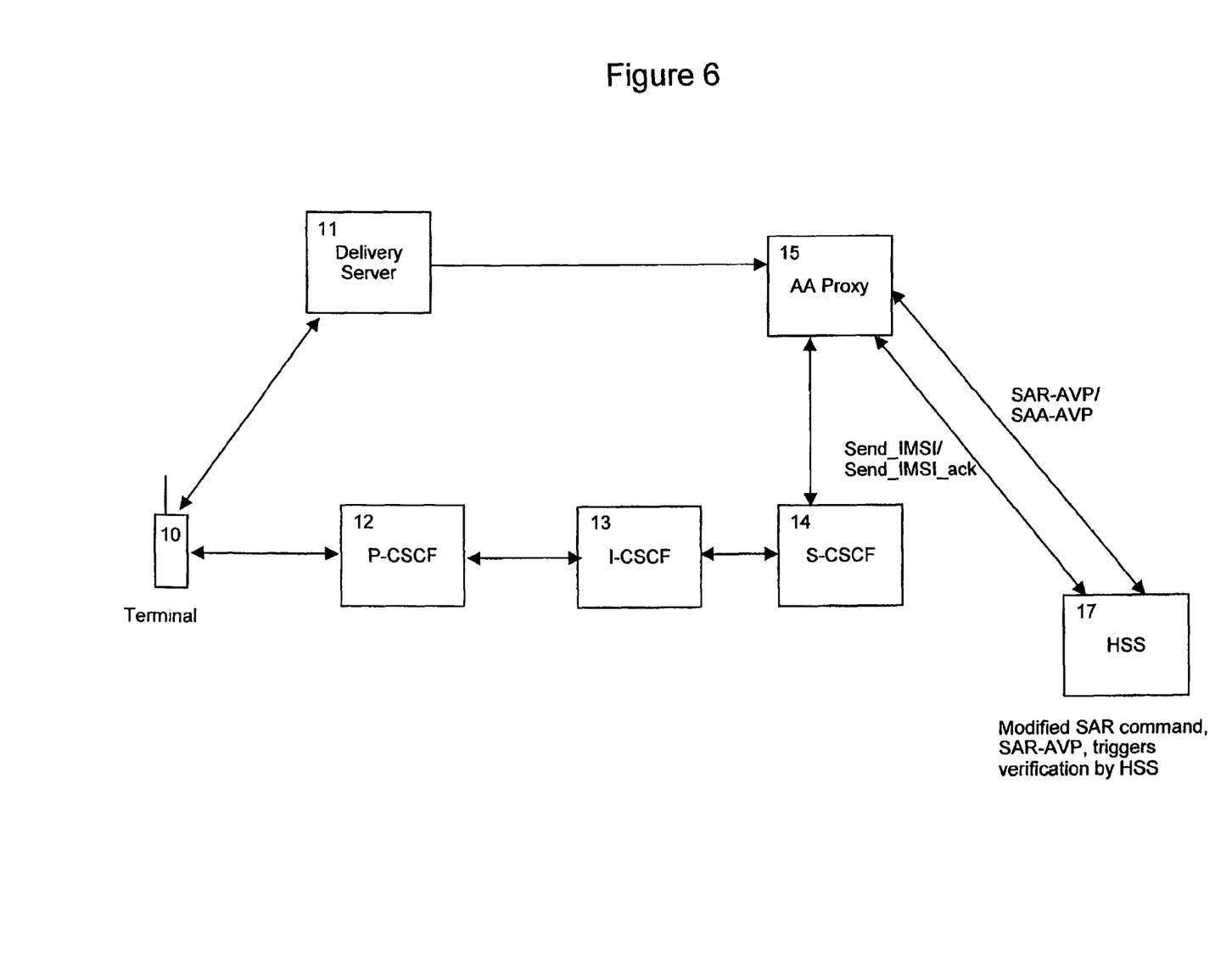
FIG. 6 shows an identity binding verification method using modified SAR/SAA.

FIG. 6 shows a fourth embodiment of the present invention, wherein the second phase comprises the use of an extended Server-Assignment-Request (SAR) command, identified as SAR-AVP in FIG. 6. The SAR command is extended to implement functionality in the HSS similar to that of the third embodiment. This requires a new value used in the existing Server-Assignment-Type AVP, for example APPLICATION_AUTHENTICATION. The AA Proxy 15 sends the SAR-SVP command to the HSS 17. This causes the HSS 17 to verify that the IMPI and the IMPU are correlated and further causes the HSS 17 to return to the AA Proxy 15 a list of the user's IMPUs. This list of IMPUs is incorporated in an extended Server-Assignment-Answer (SAA) command, identified as SAA-AVP in FIG. 6. The list of IMPUs is sent in a new grouped AVP, for example a Public-Identity-List AVP. The extended SAA command is identified as SAA-AVP in FIG. 6. Upon receipt of the plurality of the user's IMPUs, the AA Proxy 15 may verify that the list of IMPUs comprises the IMPU received from the first terminal 10, and thus verify coherence between the IMPI and IMPU used by the first terminal.

The above embodiment of the present invention allows wider use SAR/SAA commands for checking identity coherence. In alternative embodiments, the use of extended SAR/SAA commands is not limited to AA proxy 15. For example, in some embodiments it may be advantageous for the S-CSCF 14 to use the extended SAR/SAA commands.

The third and fourth embodiments of the present invention provide a dedicated behaviour for application authentication in the Home Subscriber Server.

It is envisaged by the inventors that at least one interface of the Generic Authentication Architecture described herein may be exploited by the AA Proxy 15 described above. For example, instead of using the SAR/SAA and UAR/UAA commands, the AA Proxy 15 could use a Zh or an Sh interface with the HSS 17 in order to verify correlation of at least one identity.

In alternative embodiments of the present invention using the GAA, one of a Network Application Function (NAF) and a Bootstrapping Server Function (BSF) is empowered to verify coherence between a private identity (e.g. IMPI) and a public identity (e.g. IMPU). The verification allows the usage of General Application Authentication (GAA) architecture with services that use IMPU (not IMPI) as an only user identity. The following embodiments use the same general structure as the embodiment shown in FIG. 2 and accordingly the architecture will not be described again.

A plurality of protocols are used in interfaces within the GAA architecture. Ua and Ub interfaces are required for HTTP (Hyper Text Transfer Protocol) and TCP (Transmission Control Protocol) communication. Zh and Zn are required for SCTP (Simple Control Transport Protocol) communication and DIAMETER messages.

As well as GAA, embodiments of the present invention may be applied to a network incorporating Generic Bootstrapping Architecture (GBA). GBA provides a mechanism using Authentication and Key Agreement (AKA) to install a shared secret between a UE and a server.

AKA is a very powerful mechanism used in mobile networks. GBA advantageously uses this mechanism to bootstrap application security. GBA introduces a network element (NE) called the Bootstrapping Server Function (BSF) 28. This BSF 28 has an interface with the HSS 27. The UE 20 runs AKA with the HSS 27 via the BSF 28 and a session key is derived for use by both the BSF 28 and UE 20. An application server (called Network Application Function (NAF) 29) can fetch the session key from the BSF 28 together with a set of subscriber profile information. In this way the application server (NAF 29) and the UE 20 share a secret key that can subsequently be used for application security. In particular, the secret key may be used to authenticate UE 20 and NAF 29 at the start of the application session (for at least one of integrity and confidentiality protection). The following communication is application independent: communication between the UE 20 and the BSF 28; communication between NAF 29 and BSF 28; and communication between BSF 28 and HSS 27.

The method embodying the present invention advantageously minimises the number of different types of network elements as well as the total number of network elements that retrieve Authentication Vectors (AVs) from the HSS 27. Authentication Vectors are needed by the BSF 28 to perform AKA with UE 20. Authentication Vectors are subscriber specific and change each time AKA is performed.

The present invention further provides one generic mechanism for a plurality of different applications, thus avoiding a large diversity of mechanisms and allowing security issues to be addressed once and in a consistent way.

Figure 7:
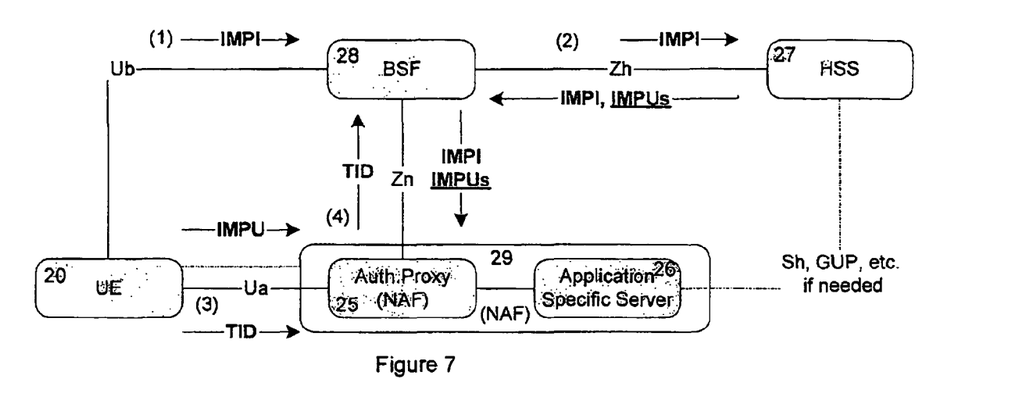
FIG. 7 shows GAA application identifier flows using Zh/Zn for IMPU transfer.

FIG. 7 shows a fifth embodiment of the present invention. The GAA can download IMPUs in respect of a given IMPI from the HSS 27 to NAF 29 via a Bootstrapping Server Function (BSF) 28. The IMPI is sent from the BSF 28 to the HSS 27 via a Zh interface. In response to this, the related IMPUs are sent by the HSS 27 as separate DIAMETER AVPs. The IMPUs are downloaded from HSS 27 via Zh to BSF 28. These IMPUs are subsequently downloaded from BSF 28 to NAF 29 via a Zn interface by adding optional Public-identifier AVPs to the Multimedia-Authentication-Answers. Hence, for a TID and an IMPU used by the UE 20 in the Ua interface, a list of all the IMPUs correlated with that TID and optionally the IMPI itself are received by NAF 29 from HSS 27. NAF 29 may then verify that an IMPU used by UE 20 is included in the received list of IMPUs in order to ensure correlation between the IMPI and the IMPU used by UE 20. The IMPU may be received by the NAF 29 from the user equipment 20.

Figure 8:
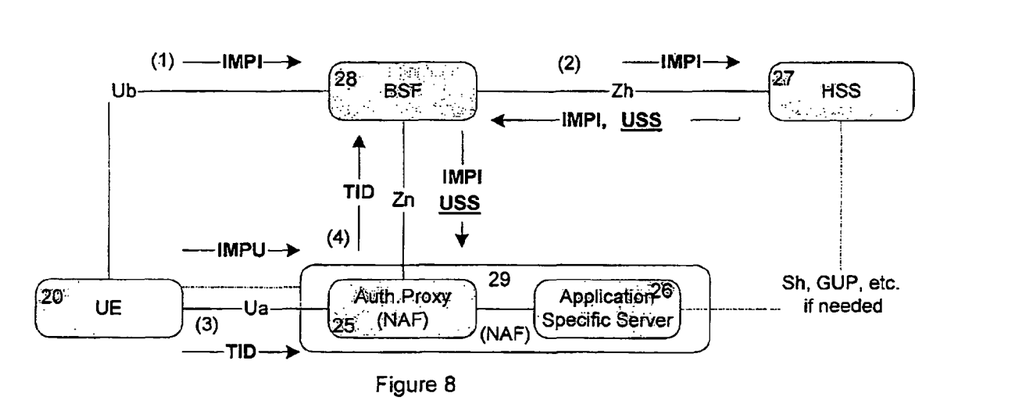
FIG. 8 shows GAA application identifier flows using Zh/Zn for USS transfer.

FIG. 8 shows a sixth embodiment of the present invention. The BSF 28 sends the IMPI to the HSS 27 via a Zh interface. In response to this, the related IMPUs are sent by the HSS 27 in an application's User Security Settings (USS) to the BSF 28. These IMPUs are subsequently downloaded from BSF 28 to NAF 29 via a Zn interface. A User Profile (i.e. User Security Settings, USS) is arranged such that it supports GAA application specific user profile information. In some embodiments, a user profile is created for every GAA application. The user profile information is stored separately in the HSS 27 and automatically transferred via both Zh and Zn interfaces. IMPUs may therefore be defined as a part of a downloaded User profile of applications that use IMPU, via both a Zh and Zn interface—that is: from the HSS 27 to the NAF 29 via BSF 28. This embodiment provides definition of a Presence specific user-profile AVP (Presence-Profile) that contains the IMPUs for which the home operator allows verification.

The structure and content of the USS data is dependent on the GAA application it is pertinent to. Generally, the USS data includes subscriber's security settings related to a particular GAA application. By way of example, if the NAF 29 is a Public Key Infrastructure (PKI) portal, then the USS data would contain two flags indicating to the PKI portal (i.e. NAF 29) whether it is allowed to issue a user certificate to the subscriber (UE 20); one flag for the status of the authentication certificate, and another for the status of the non-repudiation certificate. The USS data may comprise IMPUs, resulting in an communication scheme very similar to that shown in FIG. 7.

Figure 9:
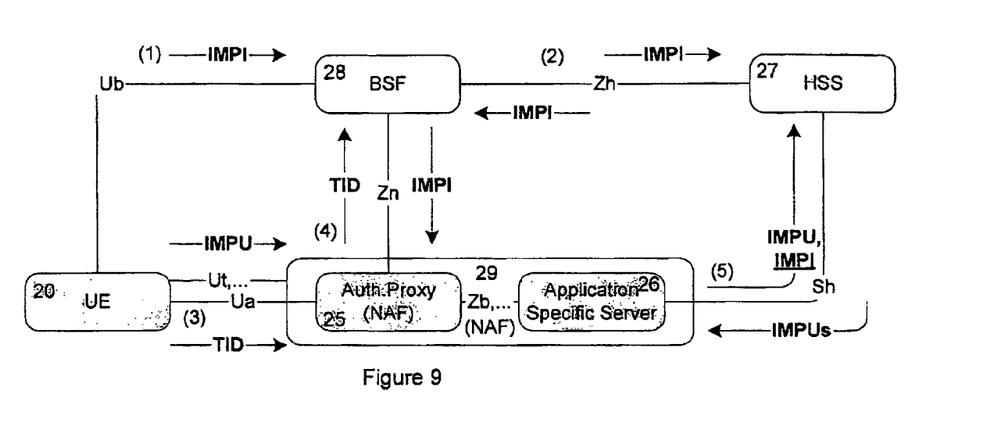
FIG. 9 shows GAA application identifier flows using Sh for IMPI transfer.

FIG. 9 shows a seventh embodiment of the present invention. This embodiment extends the capabilities of the Sh interface between the NAF 29 and HSS 27. The Sh interface is enabled to allow the NAF 29 to request a user profile using an IMPI sent from the UE 20 via the BSF 28 and an IMPU received from the UE. This is done by adding an IMPI (i.e. User-Name AVP) to a User-identity AVP in the Sh interface. This can be implemented by broadening the capabilities of the grouped User-Identity AVP by adding a new optional IMPI AVP. In response to this new request, the HSS 27 returns a list of IMPUs associated with the received IMPU. The NAF 29 may then verify that an IMPU used by UE 20 is included in the received list of IMPUs in order to ensure correlation between the received IMPI and the IMPU used by UE 20.

Figure 10:
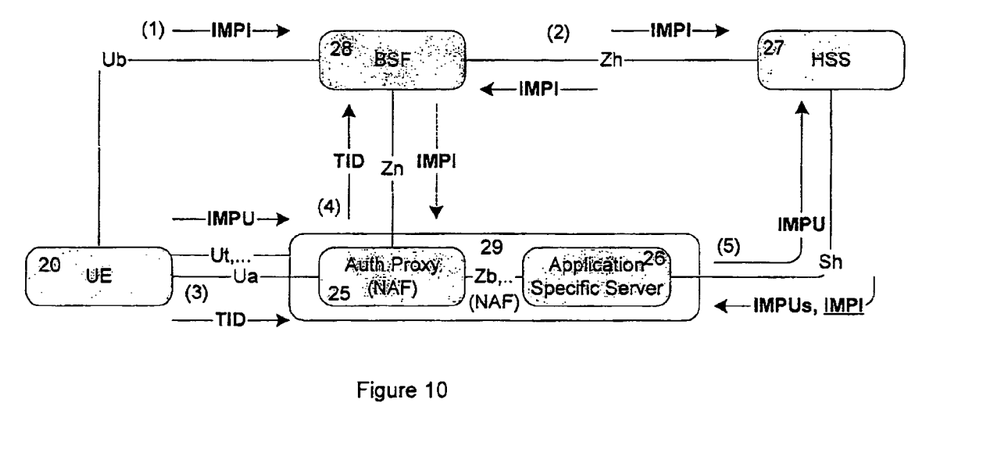
FIG. 10 shows alternative GAA application identifier flows using Sh for IMPI transfer.

FIG. 10 shows an eighth embodiment of the present invention. This embodiment extends the capabilities of the Sh interface between the NAF 29 and HSS 27. The NAF receives the IMPU from the UE and the IMPI from the UE via the BSF. The Sh interface is enabled to allow the NAF 29 to request a user profile using an IMPI sent from the UE 20 via the BSF 28. This is done by combining an IMPI sent by the UE 20 via the BSF 28 and an IMPU sent by the UE 20 into a User-Data AVP. A User-Data-Answer message is sent to the NAF 29 from the HSS 27, containing a list of all the IMPUs associated with the IMPI as well as the IMPI of the sent IMPU. This later information is contained in a User-Data AVP of the User-Data-Answer message. The NAF 29 may then verify that an IMPU used by UE 20 is included in the received list of IMPUs in order to ensure correlation between the received IMPI and the IMPU used by UE 20.

Regarding FIGS. 9 and 10, the Sh interface is used to fetch subscriber profile information from the HSS 27 to an application server based on a subscriber's IMPU. The Sh interface specification does not support retrieval of profile information using IMPI in a request. IMPI is not usually sent over a Zh interface, even when a subscriber's profile is sent from HSS 27 to application server 26. In order to transmit a subscriber's IMPI over an Sh interface, it is necessary to provide both support for IMPI-based profile retrieval and an IMPI-AVP in the corresponding subscriber profile.

Figure 11:
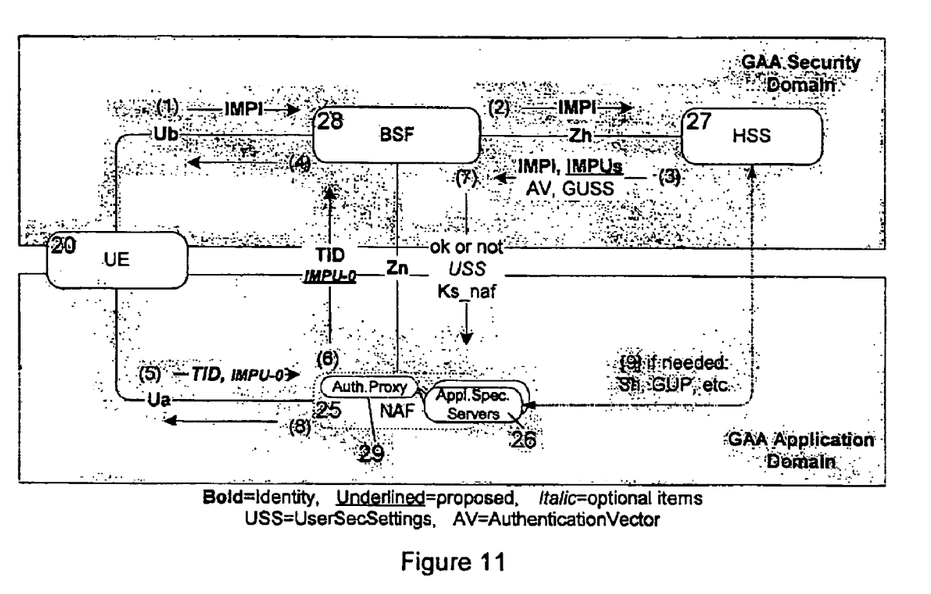
FIG. 11 shows alternative GAA application identifier flows using Zh/Zn for IMPU transfer.

FIG. 11 shows a ninth embodiment of the present invention. In this embodiment the BSF 28 performs the identification verification. The BSF 28 receives an IMPI from the UE 20 via a Ub interface. The BSF 28 sends the received IMPI to HSS 27 via a Zh interface. In response to receiving this IMPI, the HSS 27 sends a list of IMPUs to BSF 28 via the Zh interface. The NAF 29 receives an IMPU from UE 20. The NAF 29 sends this IMPU to BSF 28 via a Zn interface. The BSF 28 may then verify that an IMPU used by UE 20 is included in the list of IMPUs received from HSS 27 in order to ensure correlation between the received IMPI and the IMPU used by UE 20. Upon completion of this verification, the BSF 28 sends an indication to NAF 29 confirming verification or not, this confirmation is shown as "ok or not" in FIG. 11. Ks_naf is a NAF specific key used by NAF 29 to authenticate the UE 20, The prior art apparatus shown in FIG. 2 disadvantageously does not comprise a mechanism to verify coherence between the IMPI and the IMPU used by GAA services. While the NAF 29 does receive the IMPU from the UE 20 and optionally may receive the IMPI from the BSF 28 (the IMPI originating from the UE 20), no verification is performed by the NAF 29 to ensure that the IMPU used by the UE 20 is correlated to the IMPI used by the UE 20. Accordingly, embodiments of the present invention seek to address this problem by independently delivering the IMPI and IMPU to the NAF 29 so that the NAF 29 can perform coherence checking.

The fifth to eighth embodiments enable a NAF to check the coherence between a user's IMPI and IMPU for an application that utilizes GAA. The ninth embodiment enables the BSF to check the coherence between user's IMPI and IMPU for an application that uses GAA. The checking or verification enables the usage of GAA architecture with services that use IMPU (not IMPI) as a user identity.

The fifth and sixth embodiments enable IMPI/IMPU coherence checking in the NAF for a GAA application that does not have an interface with the HSS nor an interface that downloads IMPUs directly from the HSS.

The seventh and eighth embodiments can be implemented as extensions of application specific interfaces to the HSS.

The ninth embodiment enables IMPI/IMPU coherence checking in the BSF for a GAA application.

Embodiments of the present invention thus provide a method of verification of public and private identities of a terminal that may be deployed in real time as part of a session establishing procedure.

Embodiments of the present invention can be used in communications system other than the 3$^{rd}$ Generation systems described.

Embodiments of the present invention can be used to verify any two identities of user equipment or associated subscriber and not just the examples of public and private identities. In particular, embodiments of the present invention have been described with reference to an IP Multimedia subsystem wherein the private and public identities used are IMPI and IMPU. However, the present invention may be applied to any communication system wherein a plurality of user identities are used for one entity.

Embodiments of the invention have been described in the context of authenticating an INVITE message. It should be appreciated that any other SIP message can be similarly authenticated such as MESSAGE, REFER, SUBSCRIBE etc. It should be appreciated that embodiments of the invention can be used to verify non SIP messages. Embodiments of the invention may be applied in any situation where an entity uses two or more identities and a check needs to be made between the entities.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:
1. A method, comprising:
receiving, at a checking entity, a first public identity from a mobile terminal, wherein said first public identity comprises an internet protocol multimedia subsystem public identity, wherein the checking entity derives a private identity comprising an internet protocol multimedia subsystem private identity from a unique identifier for the mobile terminal, the unique identifier fetched, based on a second public identity for the mobile terminal, from a home subscriber server;

sending, by the checking entity to the home subscriber server, the first public identity comprising the internet protocol multimedia subsystem public identity and the derived private identity comprising the internet protocol multimedia subsystem private identity; and verifying, at the checking entity, whether the first public identity and the second public identity correspond to the mobile terminal based on the derived private identity sent to the home subscriber server and a response from the home subscriber server to the sending.

2. The method as claimed in claim 1, wherein the second public identity comprises at least one of a phone number, a mobile subscriber phone number, and a mobile subscriber integrated services digital network number.

3. The method as claimed in claim 1, wherein the sending comprises sending at least one of server assignment message and a user authorization message from an authentication proxy to the home subscriber server.

4. The method as claimed in claim 3, wherein said verification confirms an application at the mobile terminal transmitting the first public identity is authorized to use the second public identity.

5. The method as claimed in claim 1, wherein said checking entity comprises one of an application authentication proxy, a network application function and a bootstrapping function.

6. An apparatus, comprising:
a receiver configured to receive a first public identity from a mobile terminal, wherein said first public identity comprises an internet protocol multimedia subsystem public identity, wherein the checking entity derives a private identity comprising an internet protocol multimedia subsystem private identity from a unique identifier for the mobile terminal, the unique identifier fetched, based on a second public identity for the mobile terminal, from a home subscriber server;

a transmitter configured to send to the home subscriber server, the first public identity comprising the internet protocol multimedia subsystem public identity and the derived private identity comprising the internet protocol multimedia subsystem private identity; and a verifier configured to verify whether the first public identity and the second public identity correspond to the mobile terminal based on the derived private identity sent to the home subscriber server and a response from the home subscriber server to the sending.

7. The apparatus according to claim 6, wherein said apparatus further comprises at least one of a boot strapping function, a network application function, and a application authentication proxy.

8. The apparatus as claimed in claim 6, wherein said transmitter is configured to send at least one of server assignment message and a user authorization message from an authentication proxy to the home subscriber server.

9. The apparatus as claimed in claim 8, wherein the sending comprises sending at least one of server assignment message and a user authorization message from an authentication proxy to the home subscriber server.

10. The apparatus as claimed in claim 8, wherein said verification confirms an application at the mobile terminal transmitting the first public identity is authorized to use the second public identity.

11. A computer program, embodied on a non-transitory computer readable medium, for controlling a processor to implement a method, the method comprising:
receiving, at a checking entity, a first public identity from a mobile terminal, wherein said first public identity comprises an internet protocol multimedia subsystem public identity, wherein the checking entity derives a private identity comprising an internet protocol multimedia subsystem private identity from a unique identifier for the mobile terminal, the unique identifier fetched, based on a second public identity for the mobile terminal, from a home subscriber server;

sending, by the checking entity to the home subscriber server, the first public identity comprising the internet protocol multimedia subsystem public identity and the derived private identity comprising the internet protocol multimedia subsystem private identity; and verifying, at the checking entity, whether the first public identity and the second public identity correspond to the mobile terminal based on the derived private identity sent to the home subscriber server and a response from the home subscriber server to the sending.

12. A method comprising:
sending, by a mobile terminal equipment, a message to access a network, wherein the message causes a checking entity to verify the access, wherein the checking entity is configured to receive a first-public identity associated with the mobile terminal, said first public identity comprising an internet protocol multimedia subsystem public identity, wherein the checking entity is further configured to derive a private identity comprising an internet protocol multimedia subsystem private identity from a unique identifier for the mobile terminal, the unique identifier fetched, based on a second public identity for the mobile terminal, from a home subscriber server, wherein the checking entity is further configured to send to the home subscriber server, the first public identity comprising the internet protocol multimedia subsystem public identity and the derived private identity comprising the internet protocol multimedia subsystem private identity, and wherein the checking entity is configured to verify whether the first public identity and the second public identity correspond to the mobile terminal based on the derived private identity sent to the home subscriber server and a response from the home subscriber server to the sending; and receiving, at the mobile terminal, an acknowledgement, when the checking entity verifies that the first public identity and the second public identity correspond to the mobile terminal.

\* \* \* \* \*